(12) United States Patent
Kaya et al.

(10) Patent No.: US 9,216,636 B2
(45) Date of Patent: Dec. 22, 2015

(54) RETRACTABLE COVERING DEVICE

(71) Applicants: Flint Kaya, Montreal (CA); Evgeniya Rybkina, Montreal (CA)

(72) Inventors: Flint Kaya, Montreal (CA); Evgeniya Rybkina, Montreal (CA)

( * ) Notice: Subject to any disclaimer, the term of this patent is extended or adjusted under 35 U.S.C. 154(b) by 0 days.

(21) Appl. No.: 13/787,149

(22) Filed: Mar. 6, 2013

(65) Prior Publication Data

US 2013/0233498 A1    Sep. 12, 2013

Related U.S. Application Data

(60) Provisional application No. 61/607,766, filed on Mar. 7, 2012.

(51) Int. Cl.
*B60J 11/02* (2006.01)

(52) U.S. Cl.
CPC ...................................... *B60J 11/02* (2013.01)

(58) Field of Classification Search
CPC .................................. B60J 11/02; B60J 11/04
USPC ............... 296/136.01, 136.07, 136.1, 136.13; 150/166
See application file for complete search history.

(56) References Cited

U.S. PATENT DOCUMENTS

| | | | | | |
|---|---|---|---|---|---|
| 4,174,134 | A | * | 11/1979 | Mathis | 296/136.03 |
| 5,050,924 | A | * | 9/1991 | Hansen | 296/100.15 |
| 5,472,257 | A | * | 12/1995 | Kaya | 296/136.04 |
| 5,564,900 | A | * | 10/1996 | McAuley | 416/62 |
| 6,916,043 | B2 | * | 7/2005 | Rhea et al. | 280/770 |
| 7,360,820 | B2 | * | 4/2008 | Tellez | 296/136.02 |
| 2005/0212322 | A1 | * | 9/2005 | Porter | 296/98 |

* cited by examiner

*Primary Examiner* — Jason S Morrow
(74) *Attorney, Agent, or Firm* — Anglehart et al.

(57) ABSTRACT

There is provided a retractable covering device comprising a sheet for covering an object comprising sleeves for receiving cords, a plurality of cords having proximal ends secured to spools and distal ends secured to the sheet, a retraction device that can use a clutching system having a rotating member for winding the cords onto spools to retract the sheet and unwinding the cords from the spools to extract the sheet, wherein at least two sleeves are oriented essentially longitudinally in a proximal portion of the sheet and essentially in a medial lateral orientation in a distal portion of the sheet to prevent a lateral accumulation of the sheet at the retraction device during retraction. The spools can be fitted with one or more tangle prevention members (spool covers) to prevent tangling of cords during use of the retraction device.

19 Claims, 12 Drawing Sheets

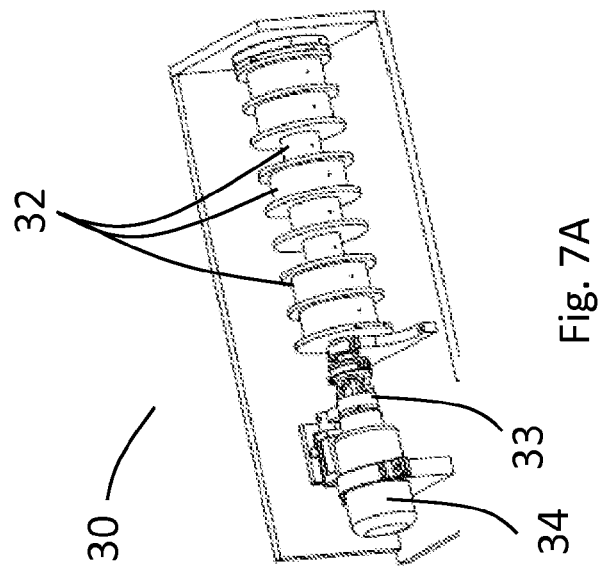
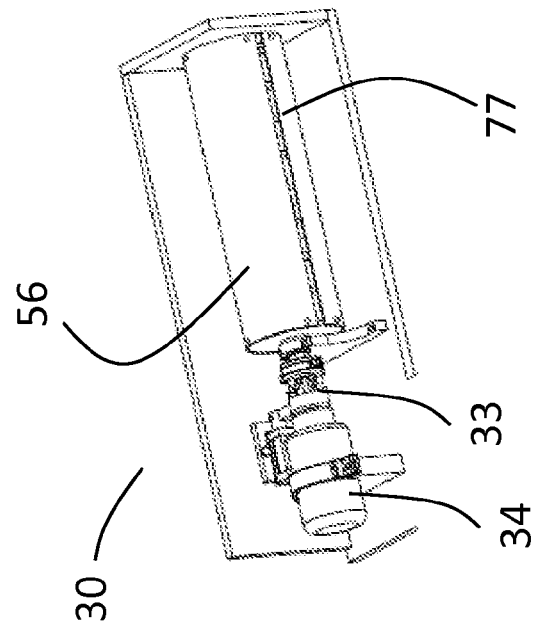
Fig. 7A
Fig. 7B

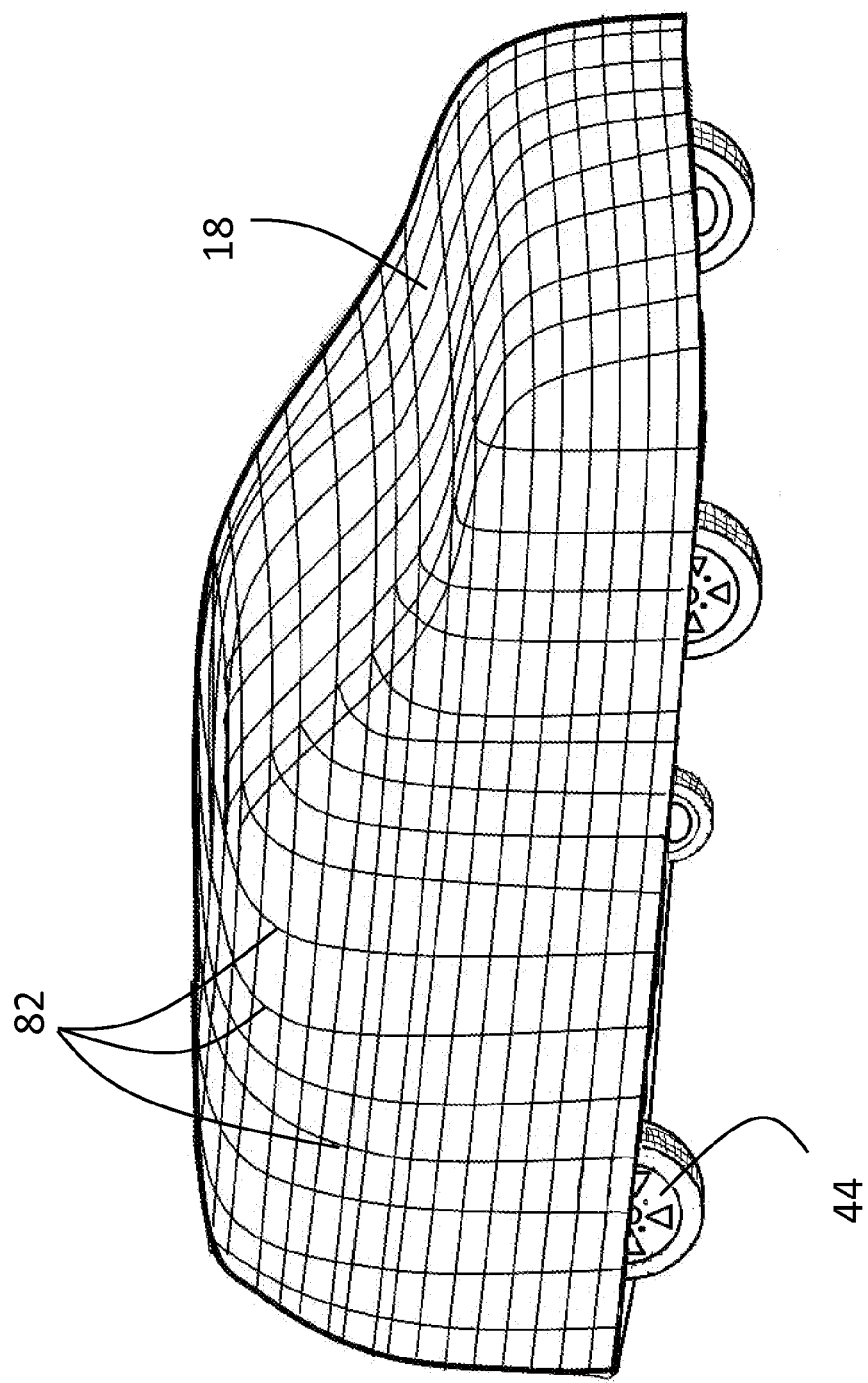

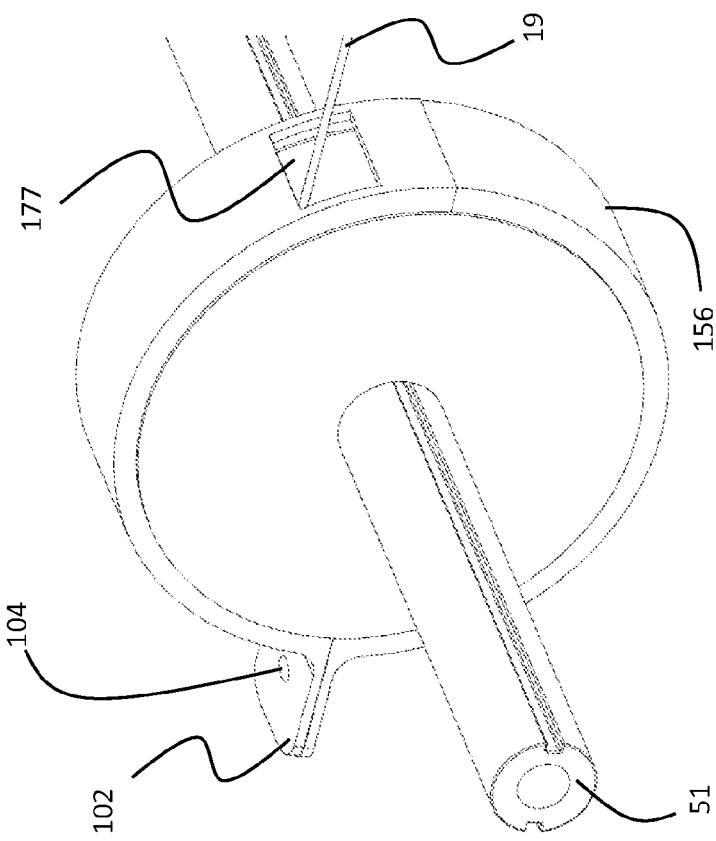
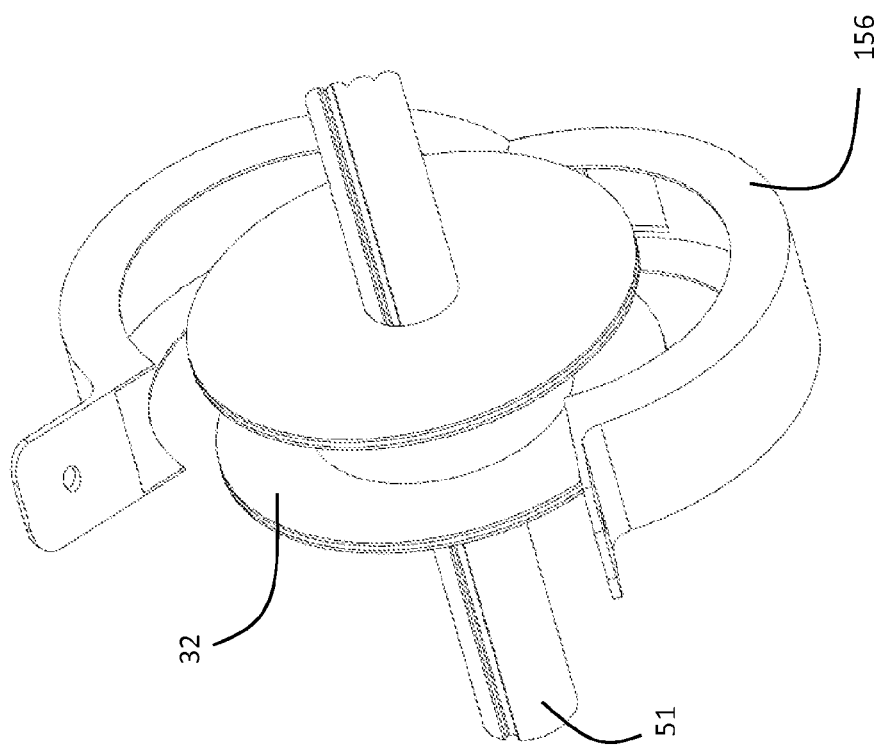
Fig. 10B
Fig. 10A

RETRACTABLE COVERING DEVICE

TECHNICAL FIELD

This invention relates generally to retractable covers. More specifically, this invention relates to improved retraction devices and sleeves for more efficient extraction and retraction of protective covers.

BACKGROUND

Car covers are well known in the art. For example, in U.S. Pat. No. 5,472,257 (hereinafter referred to as '257), Kaya teaches a Vehicle Protective Cover that automatically retracts into a case. In the '257 patent, Kaya describes an array of linear cords of different lengths running from spools of different diameters to fixed points on a sheet/cover of material. Retraction force is distributed along the longitudinal direction only and, although the sheet material is compressed longitudinally into a bundle, the system does not control the width of the compressed bundle because pressure on the incoming compressed fabric causes sideways widening rather than compressing towards the center of the retracted pile of sheet material. Furthermore, the design does not prevent the formation of air pockets and run-away patches of sheet material from developing in the space between two incoming vertical cords in the sheet fabric. These air pockets and patches of material have the tendency to stick out from the case after complete retraction of the cords, which prevents an operator from closing a door or zipping a zipper without manually stuffing the remaining sheet material into the case.

Another drawback of the Kaya '257 patent is that the cords used for the retraction get tangled on the various spools when the sheet is manually extracted from the case. This occurs because the cords cannot be pulled evenly when the sheet is extracted. The tangled cords create significant problems upon "motorized" retraction of the sheet.

Due to the above mentioned drawbacks in the prior art protective covers, it was highly desirable to develop a new and improved protective cover system that avoids these drawbacks.

SUMMARY

The Applicant has discovered that a retractable covering device with sleeves that start off essentially in a longitudinal direction and end off essentially in a medial lateral direction (toward the centerline of the sheet) prevents the accumulation of sheet material (at the retraction device) that needs to be manually pushed into a case after automatic retraction of the sheet. Furthermore, it has been discovered that a clutch system provided with several predetermined forces that act (or not) on spools can be used efficiently for extraction, retraction and tightening of a sheet onto an object being covered. It has also been discovered that a tangle prevention member can be used to prevent the tangling of cords during extraction of a sheet. The tangle prevention member can be a cylinder that fits over multiple spools or alternatively, it can be a single-spool cover configured to fit over a single spool and mate with a groove in the spool flanges, thus allowing a secure fit while still permitting free rotation of the spool independently of the single-spool cover.

It is an object of certain embodiments to provide a retractable covering device comprising a sheet for covering an object having a longitudinal direction from a proximal end to a distal end and a lateral direction (perpendicular to the longitudinal direction), the sheet comprising sleeves for receiving cords; a plurality of cords having proximal ends secured to spools and distal ends secured to the sheet, wherein the cords are essentially inside the sleeves; a retraction device having a rotating member for winding the cords onto spools to retract the sheet and unwinding the cords from the spools to extract the sheet; wherein at least two sleeves are oriented essentially longitudinally in a proximal portion of the sheet and essentially in a medial lateral orientation in a distal portion of the sheet to prevent a lateral accumulation of the sheet at the retraction device during retraction.

In some embodiments, two sleeves (of approximately 10 cm) on either side of a centerline of the sheet join at or near the centerline to form an "n-shaped sleeve". A single cord can be passed through the n-shaped sleeve and secured at or near the centerline.

In other embodiments, sleeves further comprise zig-zag patterns in a longitudinal direction for further preventing lateral accumulation of the sheet during retraction.

In yet other embodiments, the cords are secured to the sheet at a longitudinal distance proportional to spool diameter such that homogenous retraction of the sheet is achieved as a rotating member causes the cords to wind onto the spools. A plurality of handles can be affixed to the outer surface of the sheet for gripping during manipulation (extraction) of the sheet.

It is an object of certain embodiments to provide a retraction device with a clutch system for engaging the spools. The clutch system comprises a biasing assembly configured to cause engagement of the spools with a first force that allows the spools to rotate with the rotating member during retraction of the cords and a second force that allows spools to rotate independently of the rotating member during extraction of the sheet (a non-engagement force or a zero force). The biasing assembly can further comprises a third force for tightening the sheet over an object being covered. The third force causes the spools of tight cords to disengage from the rotating member and stop rotating while spools of loose cords remain engaged to the rotating member and continue to wind cords onto the spools (until tight).

In some embodiments, the engagement member comprises one or more clutch plate with a notch around the periphery of an inner aperture of the clutch plate configured to mate with a groove in a rotating member, wherein such a mating ensures rotation of the clutch plate with the rotating member; the clutch plate being placed on at least one side of the spool to engage the spool with a predetermined force.

It is an object of certain embodiments to provide a fixed cylindrical tangle prevention member that engagingly fits over the spools to prevent tangling of the cords, the tangle prevention member having an opening to allow movement of the cords into and out of the tangle prevention member during extraction and retraction of the cords. In some embodiments, the tangle prevention member can be configured to fit over and mate with a single-spool. A plurality of single-spool covers can thereby further reduce the likelihood of tangling.

It is an object of certain embodiments to provide a pullover cord having a proximal end secured to a pullover spool of the retraction device and a distal end secured to a distal end of the sheet, the pullover spool rotates independently of the other spools such that winding the outer cord onto the pullover spool pulls back the distal end of the sheet over more proximal portions thereof (to remove snow) prior to normal retraction of the sheet. At least a portion of the outer cord passes over the sheet (rather than in the sleeves) to allow the "pullover" of the sheet.

In some embodiments, the pullover cord separates into two or more pullover cords to pull back a greater lateral portion (width) of the distal end of the sheet. A pullover cord deflector affixed at a predetermined height above the retraction means to cause the distal end of the sheet to be pulled back over the sheet more efficiently.

In yet other embodiments, the sheet comprises a network of conducting lines for conducting electricity through the sheet to generate a predetermined temperature for melting snow that would otherwise accumulate on the sheet.

In other embodiments, a portable case with wheels can be used for transportation of the retraction device. The case can have a securing member for securing the case to an underside of a vehicle to facilitate extraction of sheet from the portable case.

It is another object of the present invention to provide a retractable cover comprising a sheet for covering an object having a longitudinal direction from a proximal end to a distal end and a lateral direction, the sheet comprising sleeves for receiving cords; wherein at least two sleeves are oriented essentially longitudinally in a proximal portion of the sheet and essentially medial lateral in a distal portion of the sheet to prevent a lateral accumulation of the sheet at the retraction device during retraction.

BRIEF DESCRIPTION OF THE DRAWINGS

The invention will be better understood by way of the following detailed description of embodiments of the invention with reference to the appended drawings, in which:

FIG. 7A is a partial side view of an embodiment of a retraction device. FIG. 7B shows an embodiment of a retraction device including a tangle prevention member.

FIG. 8 illustrates a sheet for covering an object with conducting lines for heating the sheet.

FIG. 10 shows a side perspective view of a single-spool cover where FIG. 10A shows single-spool cover in an open configuration and FIG. 10B shows the single-spool cover in a closed configuration.

DETAILED DESCRIPTION

Figure 1:
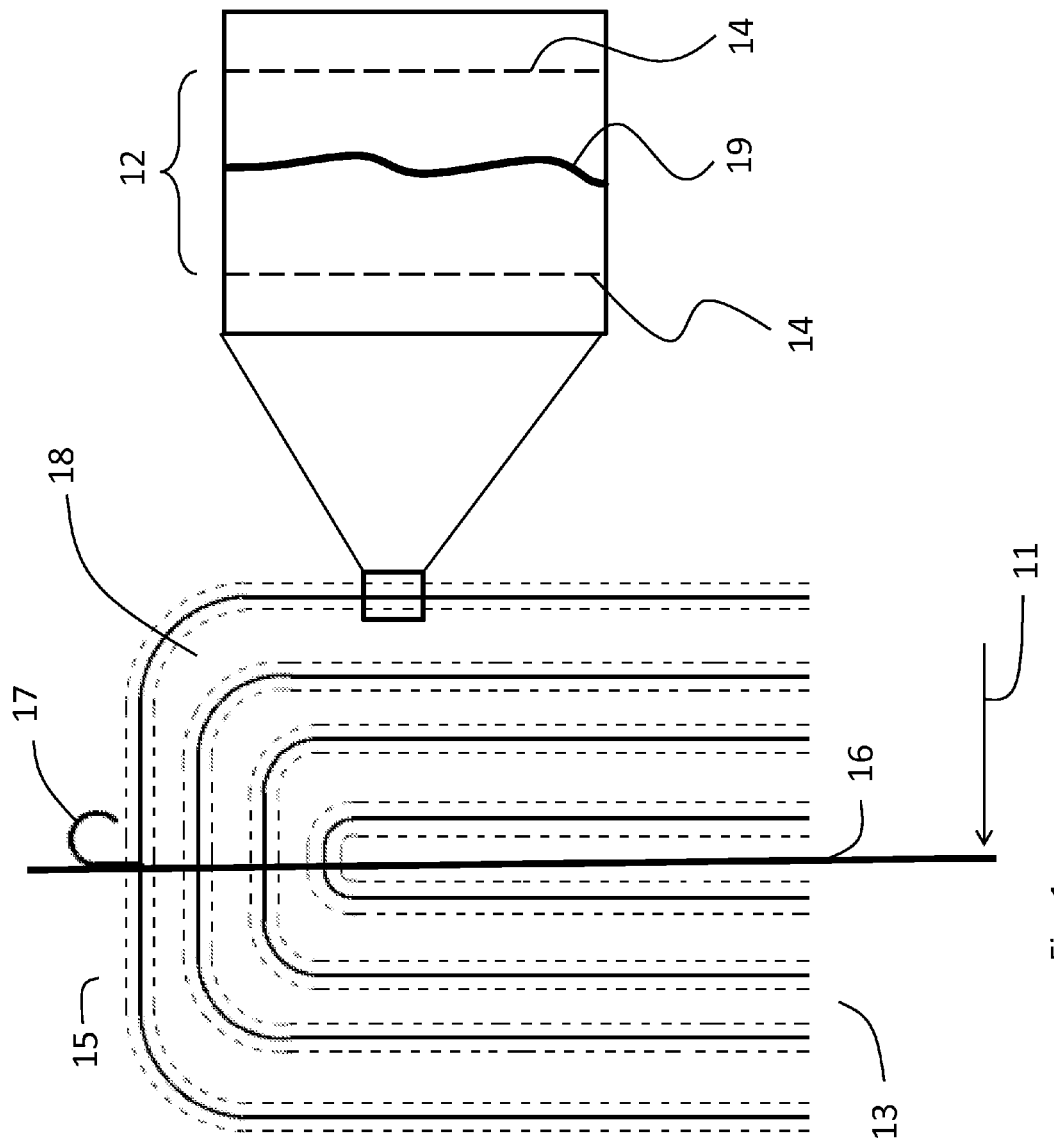
FIG. 1 is top partial view of a sheet where the proximal portion is not shown and a sleeve with a cord is blown up (right).

FIG. 1 is top partial view of a sheet 18 where the proximal portion is not shown and a sleeve 20 with a cord 19 is blown up. The sheet can be made of any type f resistant material typically used for covering vehicles such as nylon, metalized/bronzed nylon, polyester, etc.

The blown up sleeve 12 shows outer stitches on each side of the sleeve 12. The outer stitches 14 define the width of the sleeve 12. The sleeves can be made by stitching a new piece of material to the sheet or simply by folding and stitching the sheet. The material can be the same material as the sheet material but can also be a more resistant material. The high level of friction caused by the cord 19 may, in some cases, require a highly resistant material. Near the centerline 16 at the distal end of the sheet 18 is a hook 17 which allows to secure the sheet to an object such as, for example, to the underside of a motor vehicle, The sleeves 12 are designed such that theft path controls both the longitudinal and lateral surfaces of the sheet. The commercial value of such a protective cover can, in some applications, be predicated on the total size of the case (container), thus explaining the requirement for highly efficient retraction and compression of the sheet in into the case, without operator intervention.

The sleeves 12 start at a proximal end 13 where the cord 19 is attached to a spool (not shown). The sleeves 12 start out essentially in a longitudinal direction, which is understood as being an axis from the proximal end 13 to the distal end 15. Before the sleeves 12 reach the distal end 15, they orient inward toward the centerline 16. A medial 11 orientation is understood as being toward the centerline 16. A lateral direction is understood as being perpendicular to the longitudinal direction. The sleeves 12 of FIG. 1 therefore are in a medial lateral orientation at the distal portion of the sheet 18. One sleeve 12 is understood to run from a proximal end 13 to the centerline 16. The n-shaped sleeve is therefore made of two sleeves that may join at a centerline, although they need not join precisely at the centerline. The cord is located inside the sleeve and secured only at the distal end of the sheet. Upon retraction of the cord with a retraction device, an inward force on the sheet prevents the lateral accumulation of sheet material when attempting full and complete retraction of the sheet.

It will be understood that "n-shaped" comprises a multitude of shapes having two longitudinal sides and one lateral side joining the two longitudinal sides at the distal ends thereof. The shape of the "n" can vary from a rounded horseshoe to a "rectangle" with right angles that join the two longitudinal sides. It will also be understood that the distal end securing location, even if it is a single "medial" location on the sheet, will cause the two sides of the cord to be retracted independently from each other because the "n" is actually composed of one cord forming two half "n's" that are secured at or near the middle portion (centerline) of the cover.

According to an embodiment, the sheet comprises 4-6 inch wide n-shaped sleeves extending from the bottom (proximal) up towards the far (distal) end of the cover. The n-shaped sleeves are strategically located over the sheet material. In some embodiments, they form concentric layers, with the smallest in the centre. Each n-shaped sleeve and cord can be controlled by two spools. Cords are attached to spools on one end (proximal end) and to the distal end (apex) or top center of the n shaped track on the distal end. The cord is threaded through sleeves made for two strings specifically to move freely and retract while gathering and compressing material lke an accordion, retracting freely with no hindrance or stoppage usually caused by narrowing of a pocket path.

When the sheet is retracted using the n-shaped sleeve design, the cords pull down both the top (distal) left and right corners of the sheet, causing a collapse of the material surrounding the path of the n-shaped sleeves from the outside inward.

In some embodiments, the 4 to 6 concentric n-shaped sleeves per sheet allow for better control of the total cover material being retracted, hence drawing the material more uniformly towards the center (not just longitudinally). The two directional compacting system retracts cover material into a smaller more convenient case while doing away with patches of material (and air-pockets) protruding from the case after retraction.

In an embodiment of the invention, a sheet for a standard vehicle such as a car is 28 m² of fabric (or 22 feet×15 feet=330 sq/ft) and fits into a 50 cm deep×60 cm wide×20 cm high (19"×24"×8") case. The sheet is made of any material typically used for car covers. In an embodiment, a nylon sheet of 0.06 mm thickness was used advantageously.

Figure 2:
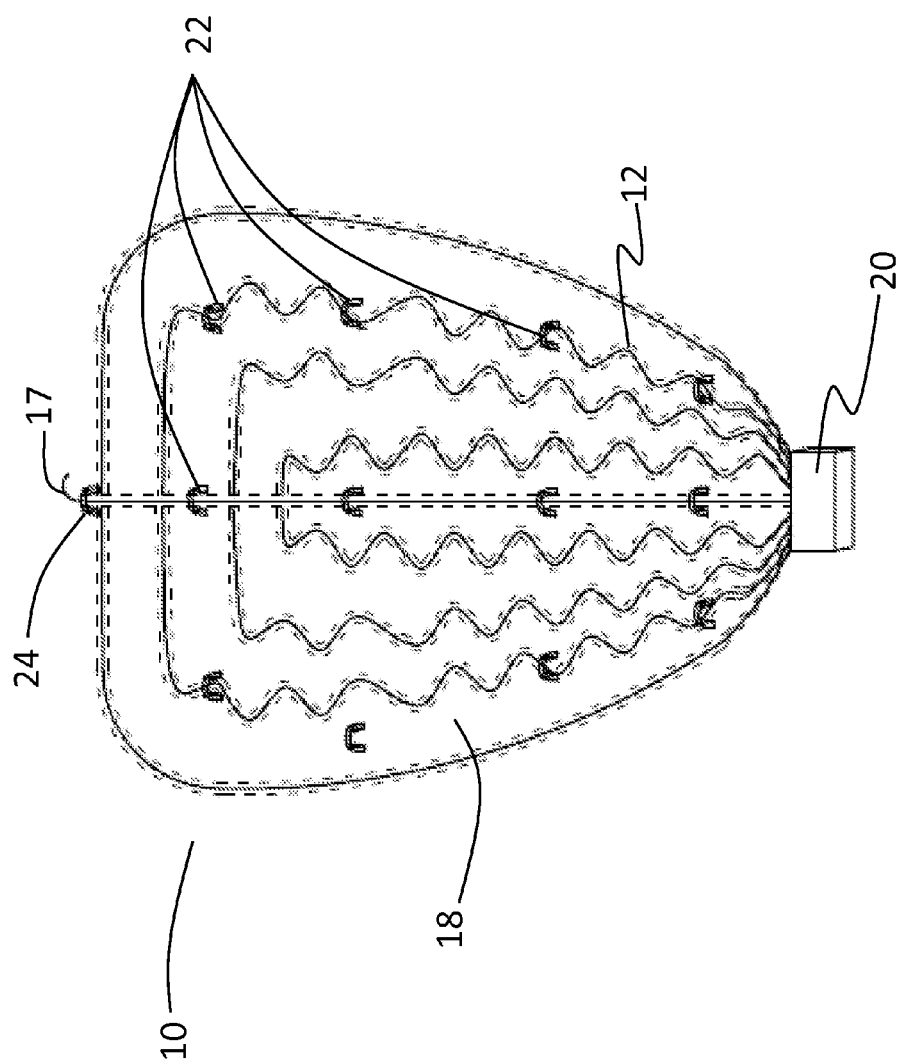
FIG. 2 is top view of a sheet with a case comprising a retraction device. The sheet comprises sleeves in a zig-zag pattern.

FIG. 2 is top view of a sheet 18 with a case 20 comprising a retraction device inside the case 20. The sheet 18 comprises sleeves 12 in a zig-zag pattern. It has been found that providing sleeves with the same overall orientation as in FIG. 1 (proximal portion generally longitudinal and distal portion generally medial lateral) but with an added zig-zag pattern further reduces the lateral accumulation of material and air pockets upon retraction of the sheet 18. The sheet has a hook 17 at the distal end. The sheet also has multiple handles 22, strategically placed along the sheet 18. For example, the handles can be brightly coloured for easy identification and placed every four feet in the longitudinal and lateral directions. When an operator wishes to cover an object using a retractable cover according to an embodiment of the invention, the hook 17 is grabbed or a central distal end main handle 24 is used to pull out the sheet 18 until enough sheet has been extracted to cover the object. Alternatively, if the object is in a tight area and no space is available for pulling out the sheet by moving away from the object, the operator can then remain next to the object and retract the sheet by grasping sequential handles along the sheet until enough material is extracted to cover the object. This can be useful in tight parking areas when covering a car.

The main handle 24 is crucial to the deployment process of the sheet out of a small case 20. It also acts as a visual aide to help centre the sheet 18 over the vehicle, making it easier to see how the sheet is distributed over the vehicle. The hook 17 allows the distal end of the sheet to be affixed and secured so that no sudden wind or motion will cause the sheet to move or blow away. The hook 17 causes the sheet to remain in its proper position prior to harnessing.

In some embodiments, the sheet has multiple handles for puffing out any cover in a confined space or for ease of deployment of a large cover. Multiple handles also allow the material to be pulled out more evenly and engage tension on all the strings because the spools are all turning simultaneously and so that the strings cannot fold in on themselves and tangle on the spools due to a lack of tension on the strings.

The sheet handles allow a person to pull out the material in stages or all at once with an even and equal allocation of material because the multiple sets of handles are arranged in a parallel fashion 2 or 3 at a time equidistantly from the distal end of the cover. This arrangement also allows the material to be fully pulled out and deployed even if in a confined space such as an indoor parking lot or shed because the multiple sets of handles are spaced to allow deployment of the material without the need to pull out the material in a continuous full cover length motion using several sets of handles. The arrangement also allows all the strings to be engaged thus keeping tension applied to the strings as the spools turn simultaneously by using the multiple sets of handles because the handles engage the different length strings more immediately than a single handle at the distal end of the sheet and thus the furthest point from the case and spools.

Figure 3:
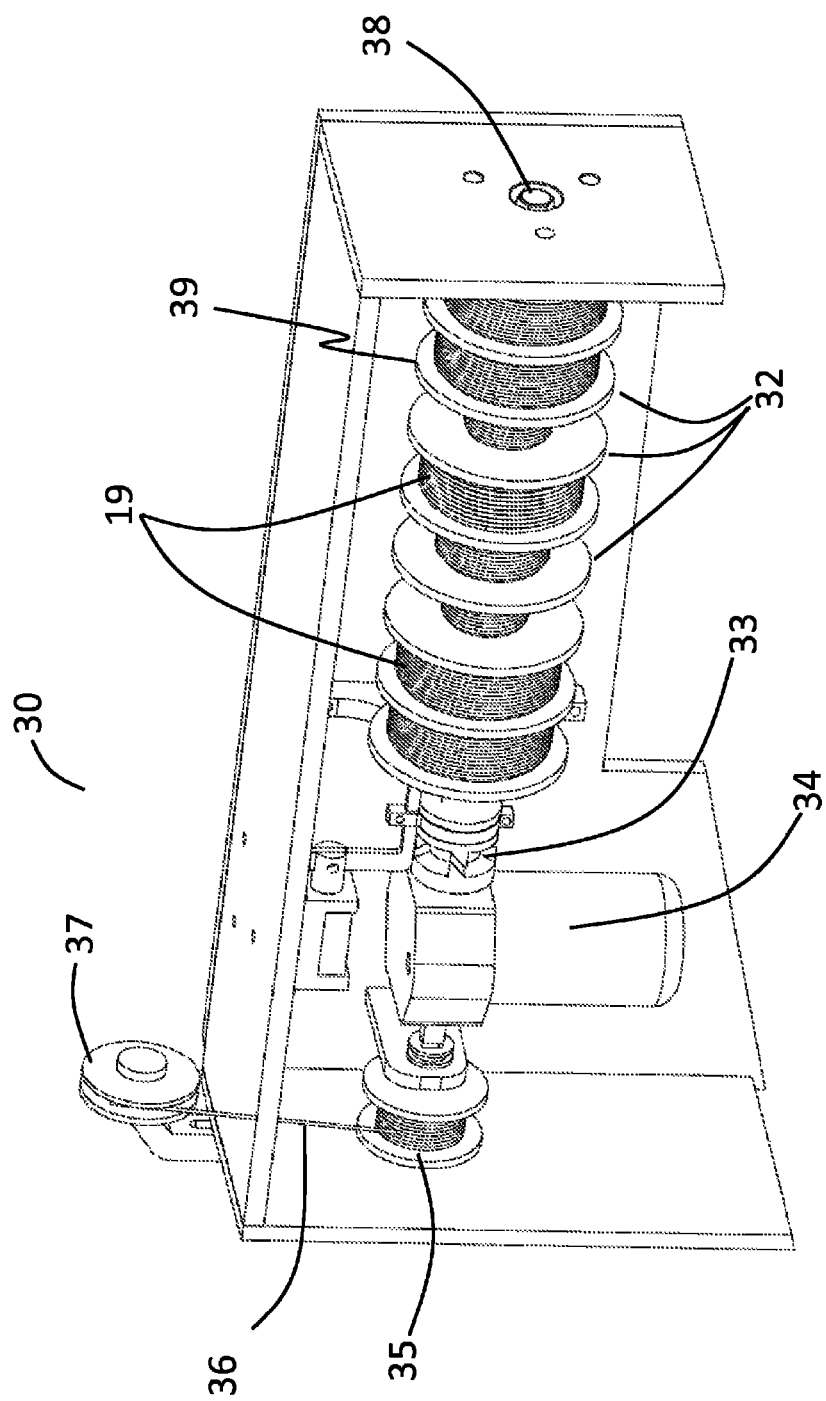
FIG. 3 is a side perspective view of an embodiment of a retraction device.

FIG. 3 is a side perspective view of an embodiment of a retraction device 30. The retraction device 30 of the present embodiment comprises a rotating member as shown in FIG. 5. The rotating members turns spools than allow to wind or unwind cords on the spools. FIG. 3 shows multiple spools 32 with cords 19 wound on them. The spools 32 have flanges 39 and they turn with the rotating member, which is engaged by an engagement member 33 (in this case, a solenoid-activated clutch). A motor 34 causes rotation the rotating member when the engagement member 33 is in the engaged position. FIG. 3 also teaches a snow removal device comprising an independent spool that can be powered by the same motor 34 but using independent rotation. A pullover spool 35 is used to secure a pullover cord 36 that is attached to the distal end of sheet 18. An important characteristic of this pullover cord 36 which is different from the other retraction cords 19 is that the pullover cord 36 does not pass through sleeves. This allows the pull over cord 36, upon retraction, to pull the sheet over the object in order to remove snow that has accumulated on the object (see FIG. 4). The cord can separate into several cords to be secured to several distal end locations of the sheet. It will be understood that this pullover system can be used to remove snow from the sheet but also any other debris that have accumulated on the sheet. Indeed, pulling the distal end over the sheet toward the proximal end causes at least part of the snow to fall to the sides of the object. This removes the extra weight of snow from the sheet and facilitates action of the retraction device 30. In an embodiment, the pullover system also comprises a pull over cord deflector 37 for increasing the height of the puffing force applied to the distal end attachment point of the pullover cord 36 on the sheet. This ensures that the distal end of the sheet will be pulled "over" the more proximal portions of the sheet. The embodiment shown in FIG. 3 also comprises a manual crank adaptor 38 that can be used to manually retract the sheet 18 by inserting and turning a manual crank. This is useful when no electrical power is available to run the motor 34.

Figure 4:
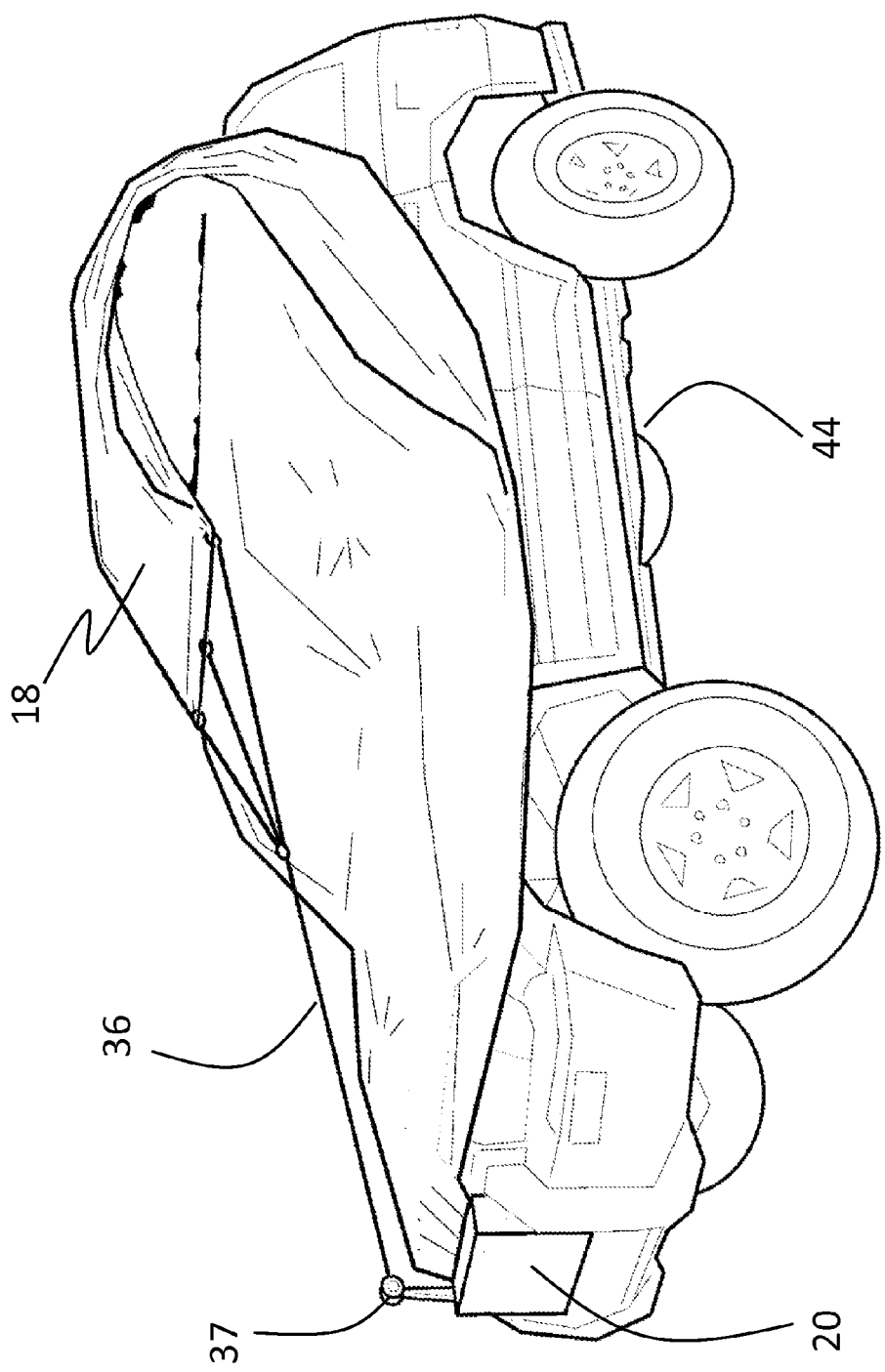
FIG. 4 is a motor vehicle with an embodiment of a retractable cover device with snow removal capabilities incorporated into the front portion of the vehicle.
Figure 5:
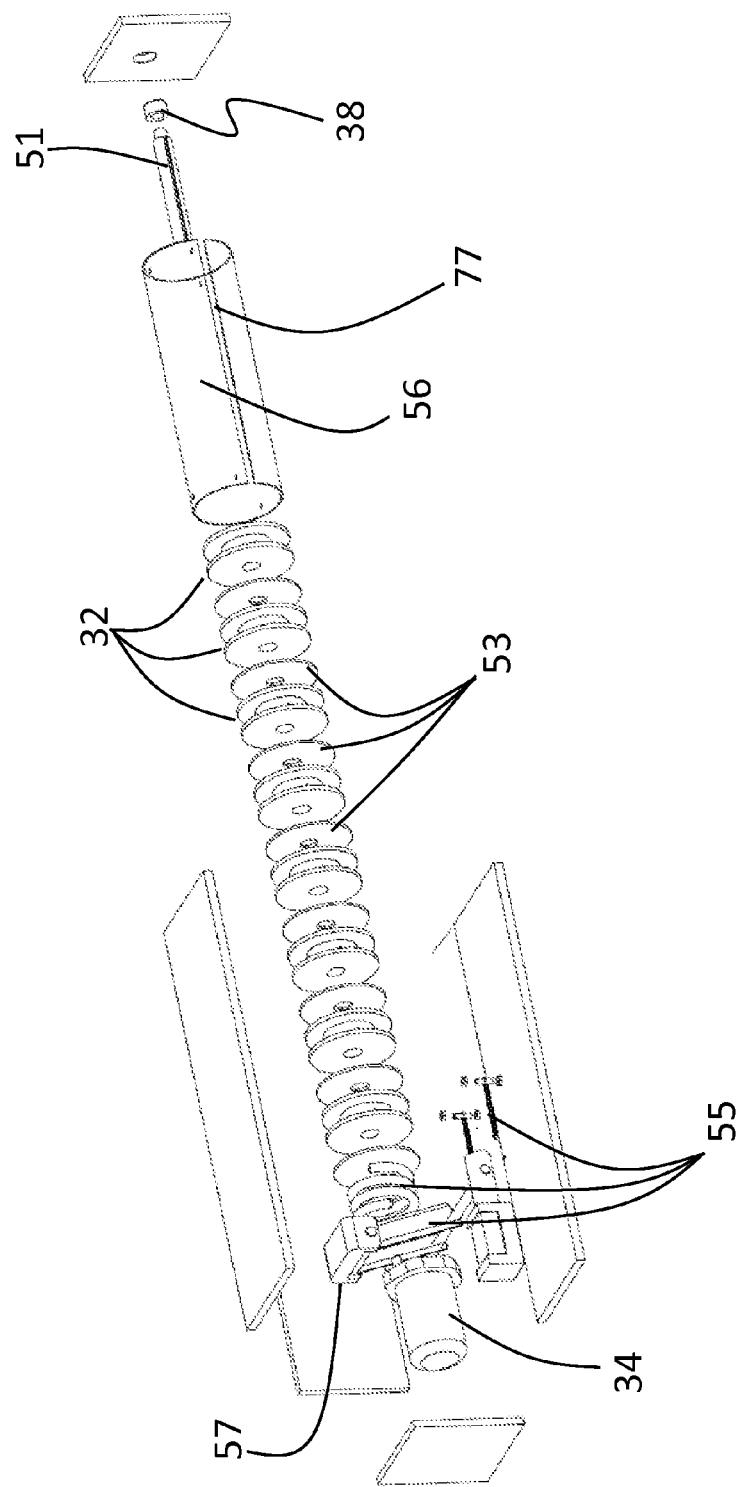
FIG. 5 is an exploded view of another embodiment of a retraction device comprising a clutch system.

FIG. 4 shows an object 44 (a motor vehicle) with an embodiment of a retractable cover device incorporated into the front portion of the vehicle. The device of the present embodiment comprises a case 20 incorporated into the front portion of the vehicle into which the sheet 18 can be retracted. The device also comprises sleeves and cords that run inside the sleeves but these are not depicted in the drawing. FIG. 4 shows a snow removal system that comprises a pullover cord 36 for puffing the distal end 15 of the sheet 18 over the more proximal portions thereof. The pullover cord is deflected upward using a pullover cord deflector 37 and is secured to a pullover spool 35 (shown in FIG. 3). This deflection ensures that a proper pullover will occur when winding pullover cord 36 onto the pullover spool 35.

In normal operation, when snow has accumulated on the sheet and the operator wishes to retract the sheet, a remote control can trigger the partial winding of pullover cord 36 onto pullover spool 35. Upon winding of the pullover cord, the distal portion 13 of the sheet 18 passes over the proximal portion and dumps snow to the sides of the vehicle. After a partial pullover has completed, the motor 34 engages the rotating member and normal retraction of the sheet can be initiated.

FIG. 5 is an exploded view of another embodiment of a retraction device 30 using a variable force clutch system. The system comprises clutch plates 53 for engaging the spools 32 with a predetermined force generated by a biasing assembly 55 comprising elements such as a spring, an actuator (solenoid, linear stepper, etc) and the like. When the biasing assembly 55 imparts a first predetermined force to the spools 32 via the clutch plates 53, activation of the motor 34 causes rotation of the rotating member 51 and spools that have a tension lower than that created by the clutch system will rotate accordingly. The biasing assembly 55 is controlled by a biasing assembly controller 57 which is responsible for setting the predetermined force to the biasing assembly 55. The retraction device 30 of the present embodiment also comprises a tangle prevention member 56. In this embodiment, the tangle prevention member 56 is cylindrical in shape and fits snugly over the spool flanges 39. Spool flanges 39 are understood as being the external ridge (rim) of the spool. Although the flanges 39 can act as tangle prevention members, it has been discovered that, in order to limit the diameter of the spool flange "discs", a protective cylinder is inserted over the spool flanges 39. Being immobile (no rotation with the rotating member), this tangle prevention member 56 fits snugly over the spool flanges 39 without preventing rotating of the spools. In this way, the cords 19 do not jump to neighbouring spools during extraction of the sheet 18. The cords 19 exit from the spool through a tangle prevention member aperture 77. A manual crank adaptor 38 for manually retracting the sheet using a crank is also shown.

The tangle prevention member 56 is important because the spools 32 unwind and spin relatively quickly when pulled manually for deployment, thus jumping out of the spools and getting tangled up. Placing a stationary tangle prevention member 56 over the spools prevents cables from jumping out of the spools 32 because the tangle prevention member 56 is in full contact with the spinning spools. A small opening/aperture in the tangle prevention member allows the cords 19 to wind and unwind from the spools. In some embodiments, it is useful to add further biasing members such as springs on the rotating member 51 between each set of spools 32 in order to keep them at a constant distance from each other, thus reducing the likelihood of cords becoming tangled.

Figure 6:
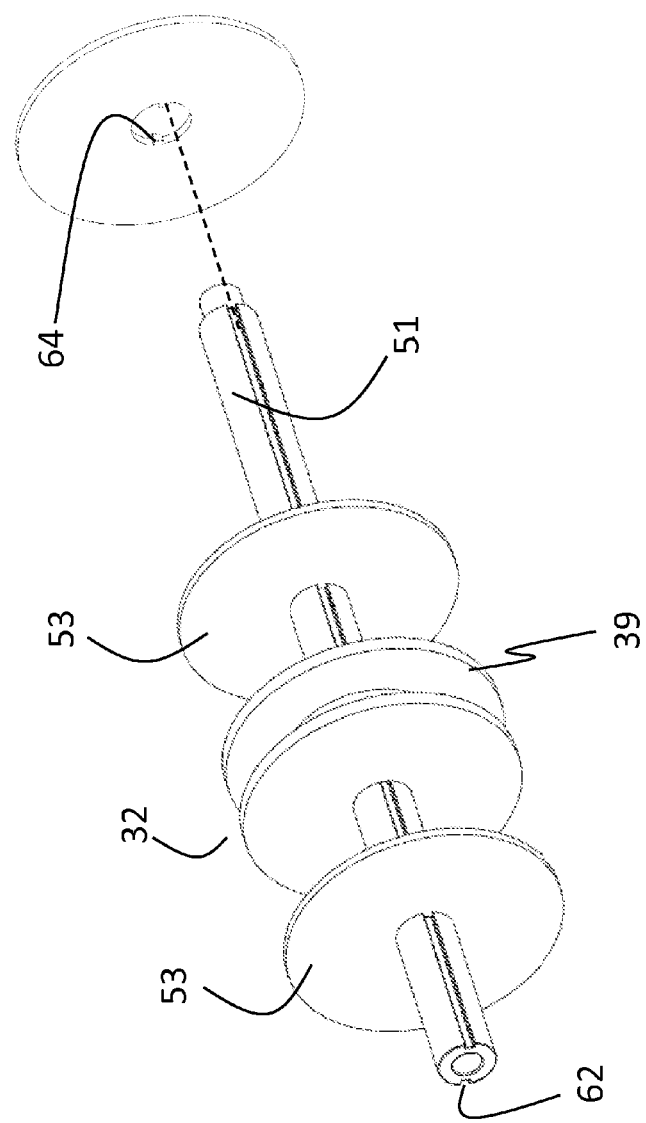
FIG. 6 is a side perspective view of a rotating member with the clutch system for engaging spools.

FIG. 6 is a side perspective view of a rotating member with the clutch system for engaging spools. The clutch system comprises a rotating member 51 having one or more grooves 62 for receiving spools 32 and clutch plates 53. The clutch plates 53 have a clutch plate notch 64 that fits into the groove 62 when the clutch plate is installed on the rotating member 51. The spool 32 does not comprise a notch and therefore rotates independently of the rotating member 51 when the predetermined force exerted by clutch plates 53 on either side of the spool is too small.

In one embodiment, three forces (or functions) can be used to act on the clutch plates 53 here a first force has been determined to be sufficient retraction of the sheet 18. A second force (zero force) is imparted for extraction of the sheet 18 and this force is understood to be the absence of force, thus allowing the cords to unwind freely from the spools 32 as the sheet 18 is being pulled out. Finally, a third force that is an intermediate force between the first and second forces, is used for acting on the clutch plates to tighten the sheet around objects after the sheet has been deployed over the object. This is useful for covering irregularly sized objects because different cords will tighten against the object at different times of the "partial retraction" process. Once a particular cord 19 has been tightened around the object, the clutch plates 53 disengage from the spool (due to a lack of sufficient force applied by the clutch plate) and allowing the spool 32 to rotate freely of rotating member 51. In this particular case, the rotating member 51 is actively rotating while the spool in not rotating.

In normal operation of an embodiment of the retraction device 30 to cover a vehicle 44, the main handle is used to pull out the sheet 18 from the case (extraction). A telescopic rod can be used to pass sheet over a high vehicle for example. The hook 17 is secured to the front end of the vehicle to ensure wind will not move or blow away the sheet during deployment. When the sheet is properly deployed, a button (can be a keychain type wireless remote control) is pressed to activate the third force (tightening/harnessing force). A spring load pressure acts on the spools via biasing assembly 55 (solenoid, actuator, linear stepper or other electric device) to engage the spools 32 with clutch plates 53 and begin harnessing by rotating the spools powered by the motor. Because some cords are shorter in length, they start choking the object very tightly. When all the cords tighten up and the take shape of the object, tightening/harnessing ends. The unit is left in locked (harnessed) position and no wind can blow this cover off. When the sheet needs to be removed from the vehicle, another button is pressed to unlock and release spring load pressure applied to the spools, at which point the hook 17 may be easily unhooked. The cords are then loosened by pulling on main handle 24 and another button is pressed to begin retraction of the sheet 18 into the case 20. When retracting the sheet into its case, each spool will continue rotating (and retracting) until no cord is left to retract, at which point the spool will disengage from the clutch plates.

FIG. 7A is a partial side cut-out view of an embodiment of a retraction device 30 similar to that of FIG. 3 without a snow removal device. The figure shows spools 32 of different diameter where the diameter is proportional to the distance between the spool 32 and the attachment point of the cord 19 to the sheet 18. This is to ensure that sheet 18 is homogeneously retracted. In the retraction device of FIG. 5, there is no need to have spools of different diameter as shown in FIG. 3 because the "clutch" system independently adjusts winding and unwinding of the cords 19 on the spools 32, FIG. 7B shows a similar embodiment with a tangle prevention member 56 that prevents the cords 19 from tangling onto other spools 32 during extraction. Spool jumping is a common problem that was found to be caused by "loose cord" that forms during unequal extraction of the sheet. In order to prevent spool jumping, it has been discovered that a tangle prevention member 56 with a tangle prevention member aperture 77 allows for the cords to be attached to the spools "inside" the tangle prevention member 56 thus being able to extract and retract without any tangling.

FIG. 8 illustrates a sheet 18 for covering an object 44 with conducting lines 82 for heating the sheet. The conducting lines 82 are configured to generate a small amount of heat when electric current is passed through them, thus preventing the accumulation of snow on the sheet. Is some embodiments, the conducting lines are concentrated on the horizontal surfaces that are more susceptible to collecting snow.

Figure 9:
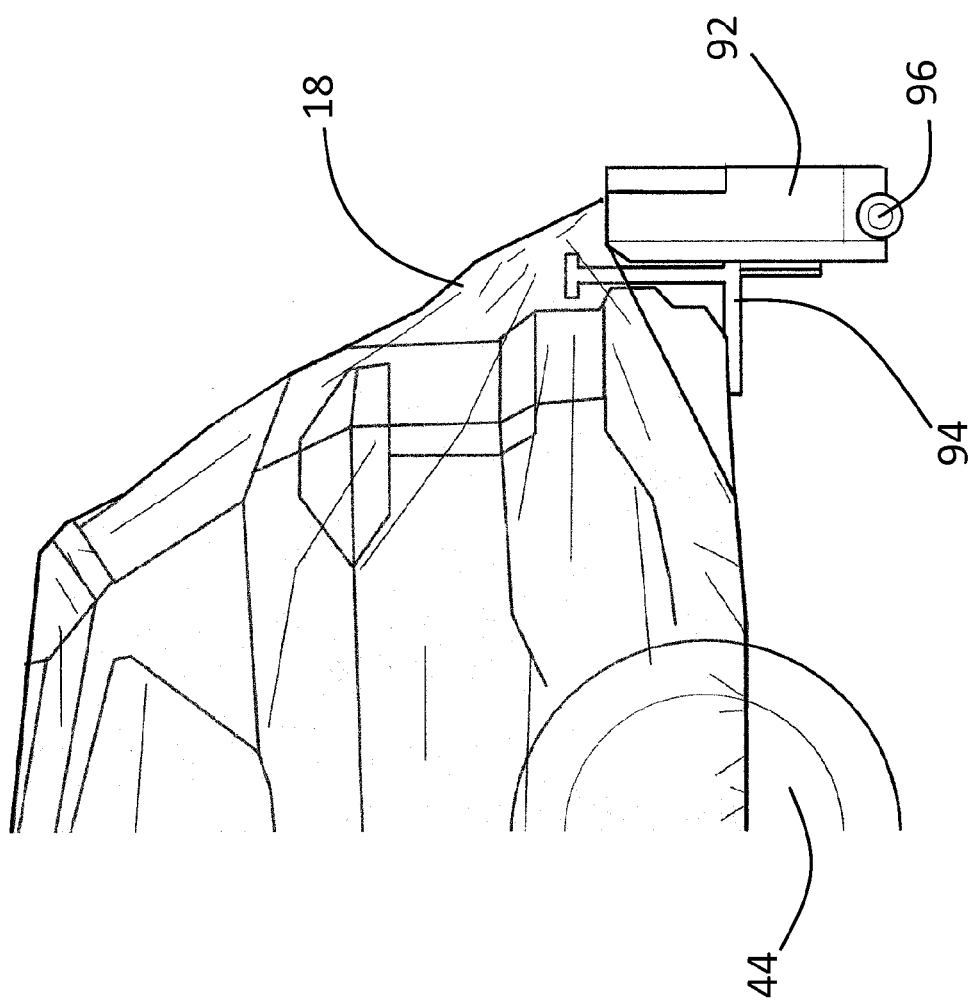
FIG. 9 is an embodiment of a portable retractable covering device.

FIG. 9 is an embodiment of a portable retractable covering device. This portable device comprises a portable case 92 for easy transportation. The portable case 92 can be stored in the trunk of a vehicle and removed for covering an object. In order to facilitate extraction of the sheet and to ensure stability of the portable case 92, a securing member 94 can be folded out from the portable case 92 and squeezed on an under side of the vehicle (such as the bumper) to immobilize the portable case 92. The portable unit has wheels 96 to facilitate movement of the portable case over long distances. The portable case 92 can be fitted with Velcro® or magnets to secure the case inside a trunk of a vehicle for example.

It will be appreciated that many different types of objects can be covered with the present invention. For example, vehicles such as automobiles, motorcycles, snowmobiles; personal watercrafts, boats, ATVs, small airplanes, farm equipment can be covered advantageously with the covering device of the present invention.

In an embodiment the covering device is used as a camouflaging system for covering military equipment; construction equipment and materials; the device can also be used in the construction industry for protecting parts of the structures under construction; any type of goods, including perishable goods; the device can be designed/decorated with large flags and banners for display at sporting events, national holidays and other celebrations.

The motorized retraction system can use rechargeable batteries that recharge using a vehicle battery or any other source of electricity.

Is some embodiments, the spring of the biasing assembly imparts an intermediate force on the clutch plates for "tightening/harnessing" after extraction. When the resistance force acting on the cord is too strong (the cord is tight), the engagement between clutch plate and spool will slip and that spool/cord maintains the sheet tightly on the object. Using a clutch plate mechanism described herein, different sized spools are not required. This alternate clutch system is advantageous for harnessing different/irregular sized objects with the same cover.

It has been discovered that, even with a multiple spool cylinder type tangle prevention member 56 as shown in FIG. 7b, the various forces generated by use of the retraction device could, in some cases, cause the cords 19 to become tangled by jumping from one spool 32 to another. For example, if the tangle prevention member is engaged too tightly to the spool flanges, the force required to turn the spools will be greater. On the other hand, if the engagement between tangle prevention member and the spool flange is too loose, the cords can tangle. FIG. 10A shows another embodiment of a tangle prevention member hereinafter referred to as a single-spool cover 156 (because it is configured to cover a single spool) in an open configuration while FIG. 10B shows the single-spool cover 156 in a closed configuration secured around the spool 32. The single-spool cover 156 can have a securing portion 102 for securing the single-spool cover 156 in a closed position on the spool using a rivet, a screw or the like placed in securing aperture 104. It will be appreciated that in a clutch-type multiple spool system such as that shown in FIG. 5, each spool can be fitted with a single-spool cover 156. The cord 19 is shown exiting from the single-spool cover aperture 177. It will be understood by those skilled in the art that the single-spool cover 156 is fixed the spool 32 can rotate with rotating member 51.

Figure 11:
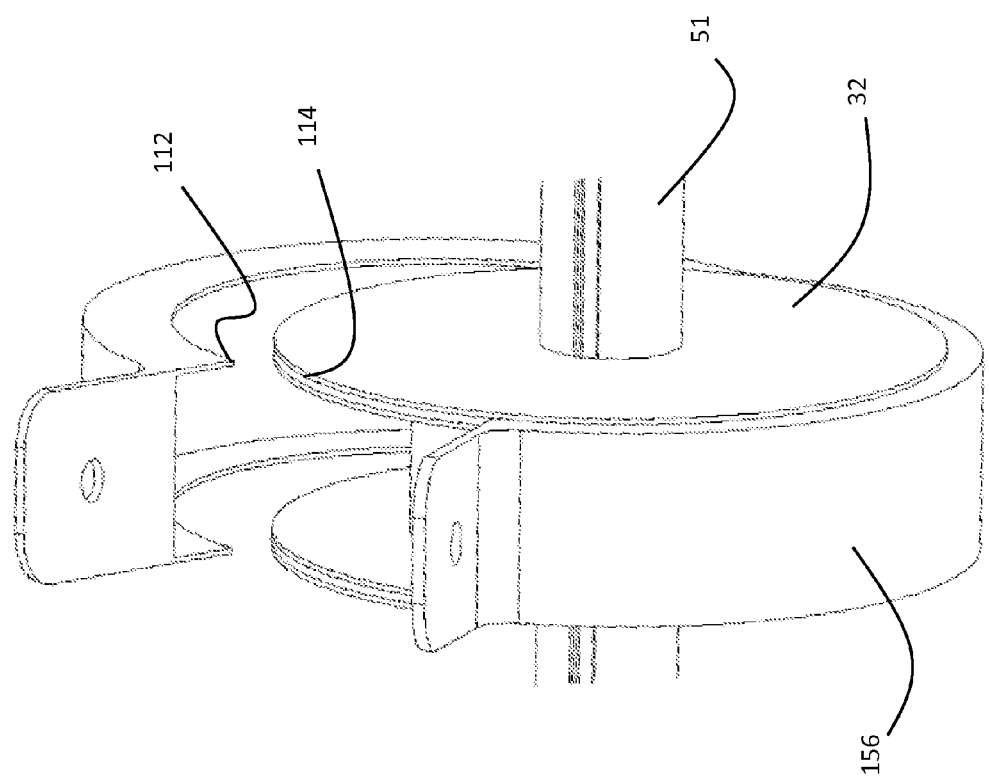
FIG. 11 shows a type of mating between the tangle prevention member and the spool flanges.

FIG. 11 shows an embodiment of the single-spool cover 156 with emphasis on the mating/interaction between the single-spool cover 156 and the spool flange 39. FIG. 11 shows a side perspective view of a single-spool cover 156 having lip 112 and a spool flange 39 having a groove 114 type of fitting that prevents the cords from jumping from one spool 32 to another. In this embodiment, the spool flange 39 has a groove 114 around its outer periphery and is configured to mate with and receive a lip 112 of the single-spool cover 156. It will be appreciated the when the lip 112 of the single-spool cover 156 is mated the groove 114 of spool flange 39, the disc-shaped outer surface of the spool flange 39 is completely free to interact with the clutch plate 53 (not shown) and the spool 32 can always rotate independently of the single-spool cover 156.

Figure 12:
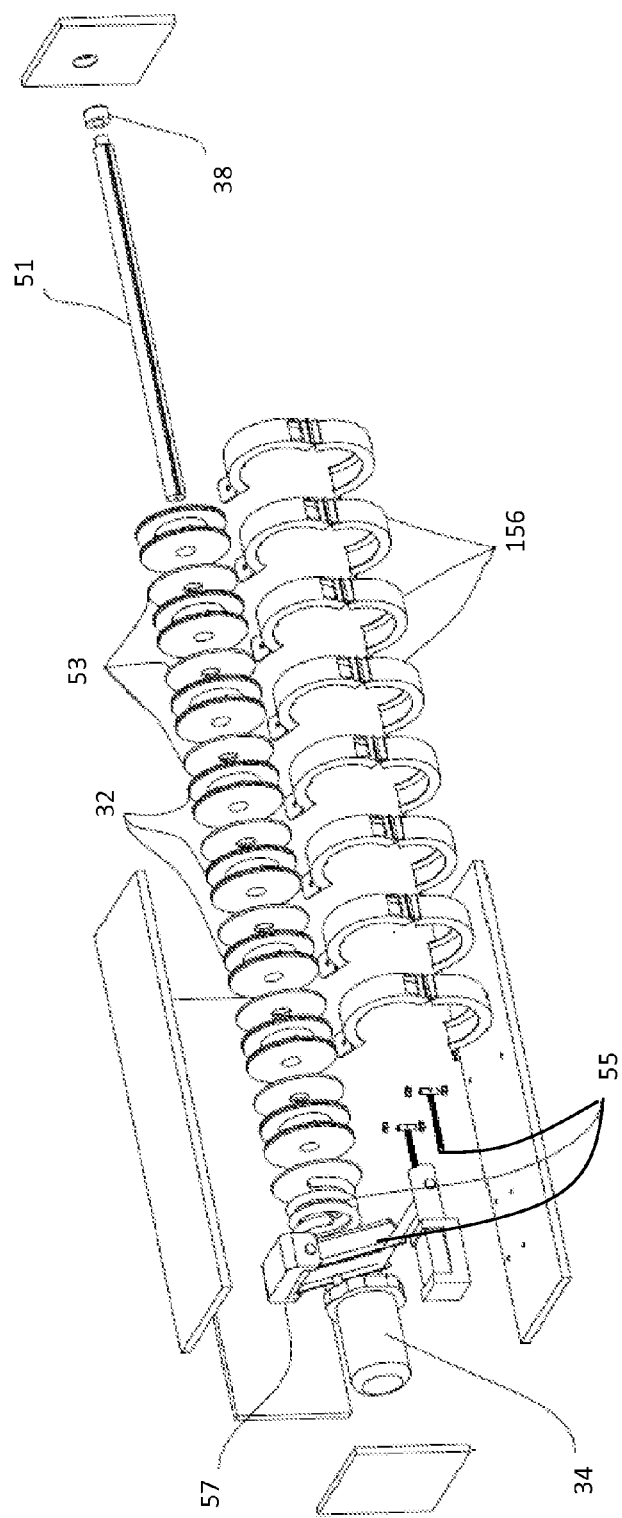
FIG. 12 shows an exploded view of a clutch system retraction device with multiple single-spool covers (tangle prevention members).

FIG. 12 shows an exploded view of a clutch system retraction device with a plurality of single-spool covers 156 (tangle prevention members). The retraction device still comprises the biasing assembly 55, the biasing assembly controller 57, the rotating member 51 with its motor 34 as a yell as spools 32 and clutch plates 53 and a crank adaptor 38.

It will be understood that longitudinal means essentially longitudinal and is a direction or orientation from a proximal end to a distal end of a sheet of the present invention. The lateral direction is understood as being perpendicular to the longitudinal direction and a medial lateral orientation should be understood as an orientation toward the longitudinal centerline. It will be further appreciated that a zig-zag portion can nevertheless be oriented essentially longitudinally.

It will be understood that the rotating member need not pass through the spools. The rotating member may engage the spools by direct contact with the spool flanges for example. The rotating member is understood as any member that turns the spools for extraction and retraction of the cords.

While the invention has been described in connection with specific embodiments thereof, it will be understood that it is capable of further modifications and this application is intended to cover any variations, uses, or adaptations of the invention following, in general, the principles of the invention and including such departures from the present disclosures as come within known or customary practice within the art to which the invention pertains and as may be applied to the essential features herein before set forth, and as follows in the scope of the appended claims.

What is claimed is:

1. A retractable covering device comprising:
   a sheet for covering an object having a longitudinal direction from a proximal end to a distal end and a lateral direction, said sheet comprising sleeves for receiving cords;
   a plurality of cords having proximal ends secured to spools and distal ends secured to said sheet;
   a retraction device having a rotating member for winding said cords onto said spools to retract said sheet and unwinding said cords from said spools and into said sleeves to extract said sheet;
   wherein at least two sleeves are oriented longitudinally in a proximal portion of said sheet and in a medial lateral orientation in a distal portion of said sheet to prevent a lateral accumulation of said sheet at said retraction device during retraction.

2. The device of claim 1, wherein two sleeves on either side of a centerline of said sheet join at or near said centerline to form an n-shaped sleeve.

3. The device of claim 2, wherein a single cord is passed through said n-shaped sleeve and secured at or near said centerline.

4. The device of claim 1, wherein said sleeves further comprise zig-zag patterns in a longitudinal direction for further preventing lateral accumulation of said sheet during retraction.

5. The device of claim 1, wherein the sheet further comprising a plurality of handles for gripping said sheet during a manipulation of said sheet.

6. The device of claim 1, wherein said retraction device further comprises a clutch system comprising a biasing assembly configured to cause engagement of said spools with a first force that allows said spools to rotate with said rotating member during retraction of said sheet and a second force that allows spools to rotate independently of said rotating member during extraction of said sheet.

7. The device of claim 1, wherein said retraction device further comprises a fixed tangle prevention member that engagingly fits over said spools to prevent tangling of said cords, said tangle prevention member having an aperture to allow movement of said cords into and out of said tangle prevention member during extraction and retraction of said cords.

8. The device of claim 7, wherein said tangle prevention member is cylindrical in shape.

9. The device of claim 1, further comprising a pullover cord having a proximal end secured to a pullover spool of said retraction device and a distal end secured to a distal end of said sheet, said pullover spool rotates independently of said spools such that winding said pullover cord onto said pullover spool pulls back said distal end of said sheet prior to retraction of said sheet; wherein a substantial portion of said pullover cord passes over said sheet.

10. The device of claim 9, further comprising a pullover cord deflector affixed at a predetermined height above said retraction means to cause the distal end of said sheet to be pulled back over said sheet.

11. The device of claim 1, wherein said sheet comprises a network of conducting lines for conducting electricity to generate a predetermined temperature of said sheet.

12. The device of claim 1, further comprising a portable case for transporting said retractable covering device and wherein said case comprises two compartments wherein a first compartment is for said retraction device and a second compartment is for said sheet.

13. The device of claim 1, wherein said object is a vehicle.

14. A retractable covering device comprising:
   a sheet for covering an object having a longitudinal direction from a proximal end to a distal end and a lateral direction, said sheet comprising sleeves for receiving cords;
   a plurality of cords having proximal ends secured to spools and distal ends secured to said sheet;
   a retraction device having a rotating member for winding said cords onto spools to retract said sheet and unwinding said cords from said spools and into said sleeves to extract said sheet; wherein a clutch system is configured to cause engagement of said spools with a first force that allows said spools to rotate with said rotating member during retraction of said sheet and a second force that allows spools to rotate independently of said rotating member during extraction of said sheet.

15. The device of claim 14, wherein said clutch system comprises a clutch plate placed on at least one side of said spool to engage said spool with a predetermined force.

16. The device of claim 15, wherein said rotating member and said clutch plate comprise a notch and groove mating that ensures rotation of said plate with said rotating member.

17. The device of claim 14, wherein said second force is essentially a zero force.

18. The device of claim 15, wherein said clutch system further comprises a third force for tightening said sheet over an object being covered, said third force causes the spools of tight cords to disengage from said clutch plate and stop rotating while spools of loose cords remain engaged to said clutch plate and continue to wind cords onto said spools until tight.

19. The device of claim 14 wherein a tangle prevention member is configured to fit over a single spool using a lip and groove mating, said tangle prevention member having an aperture for said cord.

* * * * *